United States Patent [19]

Rogers et al.

[11] Patent Number: 5,617,471
[45] Date of Patent: Apr. 1, 1997

[54] TELECOMMUNICATIONS SYSTEM FOR TRANSFERRING A TELEPHONE CALL

[76] Inventors: Wesley D. Rogers, 11428 Night Star Way, Reston, Va. 22094; Louis G. Gottlieb, 6639 Foxdale Cir., Colorado Springs, Colo. 80919; Saleem R. Molani, 7837 Hardwich Ct., Plano, Tex. 75025; Gregory W. Sedlock, 1505 Timber Edge Dr., McKinney, Tex. 75070; Roger P. Engdahl, 1200 Shaker Dr., Herndon, Va. 22070

[21] Appl. No.: 451,074

[22] Filed: May 25, 1995

[51] Int. Cl.$^6$ ............................ H04M 3/42; H04M 1/64; H04M 15/00; H04M 7/00
[52] U.S. Cl. .......................... 379/212; 379/88; 379/115; 379/127; 379/202; 379/219
[58] Field of Search ...................................... 379/201, 207, 379/210, 212, 211, 112, 115, 127, 142, 202, 215, 219, 220, 221, 67, 88, 89

[56] References Cited

U.S. PATENT DOCUMENTS

| | | | |
|---|---|---|---|
| 4,723,273 | 2/1988 | Diesel et al. | 379/211 |
| 5,369,695 | 11/1994 | Chakravarti et al. | 379/211 |
| 5,408,528 | 4/1995 | Carlson et al. | 379/211 |
| 5,432,845 | 7/1995 | Burd et al. | 379/210 |
| 5,448,632 | 9/1995 | Iyob et al. | 379/201 |
| 5,473,671 | 12/1995 | Partridge, III | 379/210 |

*Primary Examiner*—Thomas W. Brown
*Assistant Examiner*—Harry S. Hong

[57] ABSTRACT

A telecommunications system provides a call transfer function while user-A is involved in two independent calls: one with user-B and one with user-C. The call transfer by user-A is initiated by sending a message to the long distance carrier switching office. In the switching office, both independent calls are identified as part of the transfer request. The switching office then requests the call transfer function by sending a message to the network control system for the validation of the transfer. After the network control system determines allowability of the transfer, the call between user-B and user-C is connected, while user-A and user-A's customer premise equipment is disconnected from user-B and user-C.

14 Claims, 12 Drawing Sheets

| Call Leg A-B Incoming | Call Leg | Call Leg A-C Outgoing | | | | | |
|---|---|---|---|---|---|---|---|
| | | 800 | | 900 | | Vnet® | |
| | | Bill Payer | | Bill Payer | | Bill Payer | |
| 800 | A-B<br>A-C<br>B-C | A<br>C<br>C | | 800 to<br>900<br>Illegal | | A<br>A<br>C or A | |
| 900 | A-B<br>A-C<br>B-C | A&B<br>C<br>C | | A&B<br>A&C<br>C&B | | Not<br>Allowed | |
| Vnet® | A-B<br>A-C<br>B-C | B<br>C<br>B | | Not<br>Allowed | | B<br>A<br>B | |

FIG. 3

| Call Leg A-B Incoming | Call Leg | Call Leg A-C Incoming | | |
|---|---|---|---|---|
| | | 800 | 900 | Vnet ® |
| | | Bill Payer | Bill Payer | Bill Payer |
| 800 | A-B<br>A-C<br>B-C | Not<br>Allowed | Not<br>Allowed | A<br>C<br>A |
| 900 | A-B<br>A-C<br>B-C | Not<br>Allowed | Not<br>Allowed | Not<br>Allowed |
| Vnet ® | A-B<br>A-C<br>B-C | B<br>A<br>B | Not<br>Allowed | B<br>C<br>B |

FIG. 4

| Call Leg A-B Outgoing | Call Leg | Call Leg A-C Incoming | | | | |
|---|---|---|---|---|---|---|
| | | 800 | 900 | | Vnet® | |
| | | Bill Payer | Bill Payer | | Bill Payer | |
| 800 | A-B<br>A-C<br>B-C | B<br>A<br>A or B | Not<br>Allowed | | B<br>C<br>B | |
| 900 | A-B<br>A-C<br>B-C | Not<br>Allowed | Not<br>Allowed | | Not<br>Allowed | |
| Vnet® | A-B<br>A-C<br>B-C | A<br>A<br>A or B<br>A-Vnet®<br>B-800 | Not<br>Allowed | | A<br>C<br>C | |

FIG. 5

| Call Leg A-B Outgoing | Call Leg | Call Leg A-C Outgoing ||||||
| | | 800 | | 900 | | Vnet® | |
| | | Bill Payer | Bill Payer | Bill Payer | Bill Payer | Vnet® | Bill Payer |
| 800 | A-B<br>A-C<br>B-C | | Not<br>Allowed | | Not<br>Allowed | | B<br>A<br>B |
| 900 | A-B<br>A-C<br>B-C | | No 900<br>on Call<br>Leg 1 | | No 900<br>On Call<br>Leg 1 | | No 900<br>on Call<br>Leg 1 |
| Vnet® | A-B<br>A-C<br>B-C | A<br>C<br>A or C | | | Not<br>Allowed | | A<br>A<br>B |

TELECOMMUNICATIONS SYSTEM FOR TRANSFERRING A TELEPHONE CALL

FIELD OF THE INVENTION

This invention relates to a telecommunications system, and in particular to a telecommunications system for transferring a telephone call to a third telephone station while releasing the transferring station from the conversation.

BACKGROUND OF THE INVENTION

Modern business environment requires variety of telephone services to accommodate increasingly complex and numerous transactions. A call transfer feature has become one of the popular options desired by businesses. A technician in a technical assistance department of a computer manufacturer, for example, receives a telephone call from a purchaser of the computer equipment inquiring about the problem in its operation. After using a diagnostic program to test the computer hardware, the technician concludes that the "bug" resides in the software. He then would like to transfer the call to the software manufacturer having expertise in the software which causes the "bug" and release his telephone line with the computer purchaser to receive other incoming calls.

Currently, customers use their customer premise equipment (CPE), such as a private branch exchange (PBX) or automatic call distributor (ACD), in order to transfer a call from one termination to another. In fact, a call transfer feature has been available on CPE for a long time. However, a call transferred at CPE continues to occupy telephone lines between the long distance carrier network and CPE of a transferring station, even though the call has been transferred to a telephone station outside CPE. Consequently, the capacity of CPE for incoming and outgoing calls is diminished under the current CPE-based transfer.

Typically, the CPE-based transfer appears as two independent and separate telephone calls to the long distance carrier network: one incoming to CPE and one outgoing from it. This presents an additional disadvantage in billing for the transferred call. The caller at transferring station continues to pay for the transferred call, despite the caller's inability and absence of participation in the conversation.

As an alternative to CPE, a local exchange carrier (LEC) may offer a Centrex service with a call transfer feature. The Centrex, however, is a single line telephone service, not being sufficiently flexible to accommodate business needs which require support of many configurations.

A need therefore exists to provide a telecommunications system for transferring a telephone call without the disadvantages associated with the transfer at CPE.

OBJECTS OF THE INVENTION

It is therefore an object of the invention to move the transfer functionality to the long distance carrier network.

It is another object of the invention to transfer a call and make the telephone lines between CPE and the long distance carrier switching office available for additional calls.

It is yet another object of the invention to provide flexibility of a billing exchange in which the charges for the transferred call may accrue either to the transferring station or other stations participating in the call.

SUMMARY OF THE INVENTION

These and other objects, features, and advantages are accomplished by a telecommunications system which provides to customers of a long distance carrier the capability to move the call transfer function from their customer premise equipment (CPE) to the long distance carrier network of a long distance carrier, thereby making their CPE available for other calls.

The disclosed telecommunications system comprises a first telephone station which communicates with a second telephone station. The second telephone station in turn communicates with a third telephone station. The second telephone station, then, desires to be disconnected from both conversations and instead wishes to connect the first telephone station with the third telephone station. Connected, via a customer premise equipment, to at least the second telephone stations is a long distance carrier switching office. The switching office sends a message to a network control system requesting communication between the first and the third telephone stations. The network control system which serves the switching office includes a database and a processing means. The network control system determines the allowability of the transfer and responds to the request from the switching office with a response message. If the transfer is allowed, the network control system connects the first telephone station with the third telephone station and disconnects the second telephone station from the communication with the first and the third stations.

DESCRIPTION OF THE PREFERRED EMBODIMENTS

A high level overview, presented below, describes the call transfer function of the disclosed telecommunications system. The call transfer function can be evoked while user-A is involved in two independent calls, one with user-B and one with user-C. Each of the calls can be either incoming or outgoing from user-A's perspective. Prior to using the feature, user-A may not know that the calls might be transferred to each other. The call transfer by user-A is done by sending a message to the long distance carrier switching office (switch). In the switch, both independent calls are identified as part of the transfer request. At this point, the call transfer request is launched to the network control system (NCS) for the validation of the transfer. After NCS determines that the requested transfer is allowed, the call between users B and C is connected while user-A and user-A's CPE is disconnected from users B and C.

Figure 1:
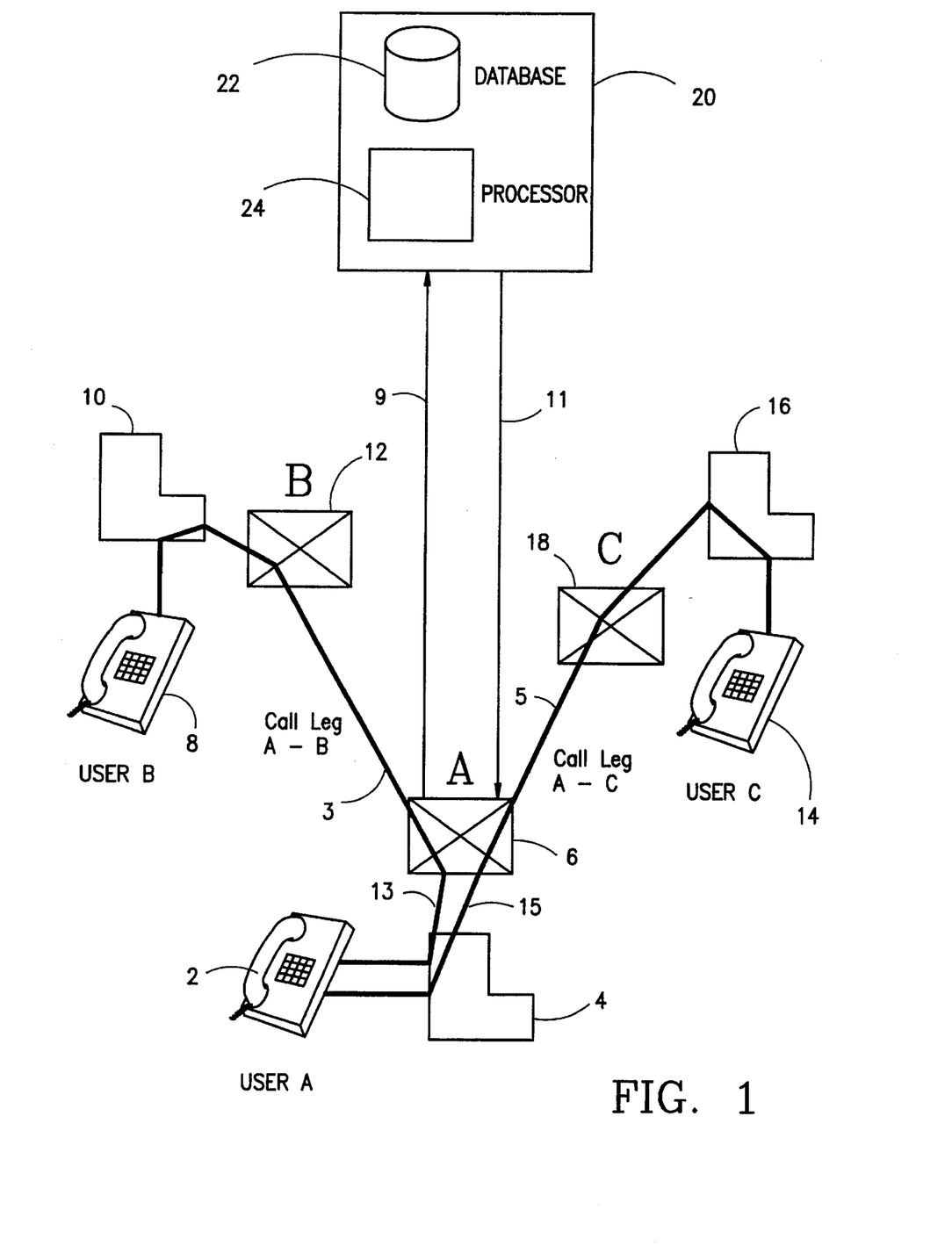
FIG. 1 is a telecommunications system for transferring a telephone call prior to the transfer.

FIG. 1 depicts the network call processing in a basic call transfer scenario. User-A 2 is connected via CPE 4 to switch-A 6. User-A 2 is communicating with user-B 8 who is similarly connected to switch-B 12 through CPE 10. User-A 2 is further communicating with user-C 14 connected to switch-C 18 via CPE 16. Thus, call leg A–B 3 and call leg A–C 5 are established between the users A and B, as well as the users A and C, respectively. It is understood that user-B 8 and user-C 14 may not be connected to their respective CPEs, and instead directly served by LEC (not shown) if a residential call is involved. Alternatively, user-A 2 and CPE 4 may be replaced by CPE, such as Interactive Voice Response (IVR) or Voice Response Unit (VRU), which automatically receives and originates the calls without any human intervention.

User-A 2 initiates the call transfer by notifying switch-A 6 of the transfer request. Both independent calls, i.e., call legs A–B 3 and A–C 5, are identified as part of the transfer. Switch-A 6 sends a request message 9 to NCS 20 requesting the set-up of communication between user-B 8 and user-C 14. A processor 24 accesses a database 22, located in NCS 20, to determine whether the requested transfer is allowed. NCS 20 then returns a response message 11 to switch-A 6 responding to the request message 9.

Figure 2:
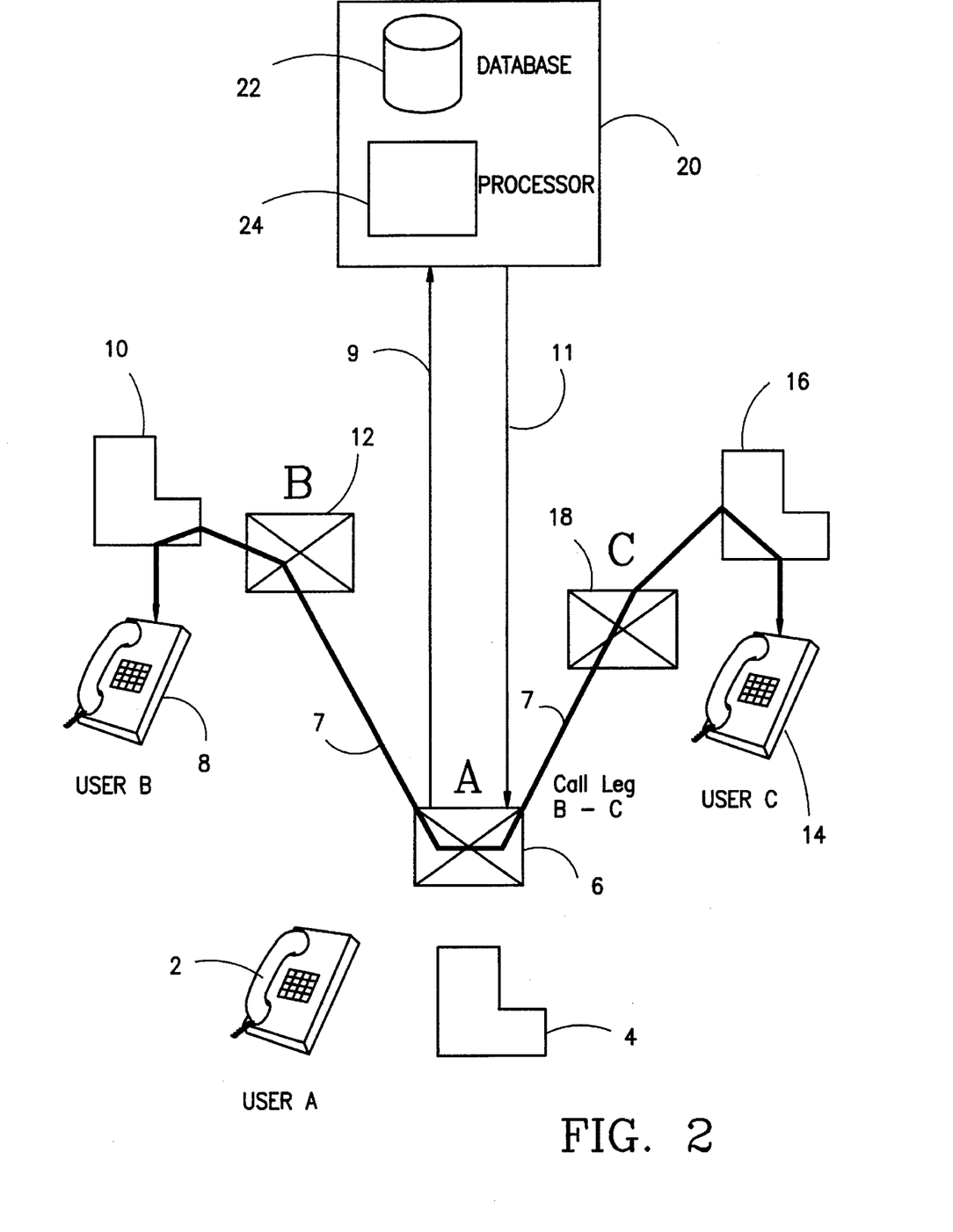
FIG. 2 is the telecommunications system of FIG. 1 after the call transfer.

If the transfer is allowed, switch-A 6 connects user-B 8 with user-C 14 setting up call leg B–C 7, as shown in FIG. 2. Switch-A 6 also disconnects user-A's CPE 4 and user-A 2 from the conversation, as shown in FIG. 2. If the transfer is not allowed, switch-A 6, having received the response message 11 which disallows the transfer, notifies user-A 2 via CPE 4 of the denied request to transfer the call.

With reference to FIGS. 1 and 2, like reference numerals designate identical elements of the disclosed invention. Furthermore, the alphabetical designations of the call legs merely indicate the communication between the users, without designating the calling party and the called party.

Continuing with the description, although there are more than four transfer scenarios, the four major ones are shown in the network call transfer for illustrative purposes only. User-A 2 is the reference point as the transferring party, and the four major scenarios are described with reference to FIGS. 1 and 2:

(1) Call leg A–B 3 is an incoming call, and call leg A–C 5 is an outgoing call.

(2) Call leg A–B 3 is an incoming call, and call leg A–C 5 is an incoming call.

(3) Call leg A–B 3 is an outgoing call, and call leg A–C 5 is an incoming call.

(4) Call leg A–B 3 is an outgoing call, and call leg A–C 5 is an outgoing call.

Referring to FIG. 1, the first situation involves an incoming call to user-A 2, and an outgoing call from user-A 2. User-B 8 calls user-A 2, and the long distance carrier network sets up call leg A–B 3 as the incoming to user-A 2. User-A 2 answers the call from user-B 8 and puts him/her on hold at CPE 4. Alternatively, user-B 8 may not be placed on hold resulting in a temporary three-way conference call.

User-A 2 then makes a call to user-C 14, and the long distance carrier network sets up call leg A–C 5. Thus, two calls are in progress, one from user-B 8 to user-A 2, and the other from user-A 2 to user-C 14.

Next, user-A 2 indicates to CPE 4 to connect user-B 8 to user-C 14. User-A's CPE 4 sends a message to switch-A 6 to carry out the transfer. Switch-A 6 bridges call legs A–B 3 and A–C 5, and releases the voice channels 13 and 15 for these calls between switch-A 6 and CPE 4, as depicted in FIG. 2. This results in the voice channels 13 and 15 being available for additional calls to user-A 2.

Prior to setting up call leg B–C 7, switch-A 2 queries NCS 20 for permission to transfer by sending the request message 9. The processor 24 accesses the database 22 to determine whether call leg B–C 7 (shown in FIG. 2) is allowed, and NCS 20 communicates the result of that determination via the response message 11. If the transfer is allowed, only then switch-A 2, acting as a tandem, sets up call leg B–C 7 as shown in FIG. 2. In NCS 20, the processor 24 accesses the database 22 to determine the allowability of the transfer. In addition, the database 22 includes the following information: the party responsible for charges for call leg B–C 7, the service type (800, Virtual Private Networks such as Vnet®, 900, etc.) of call leg B–C 7, and whether user-B 8 and/or user-C 14 should be notified of the call transfer.

Figure 3:
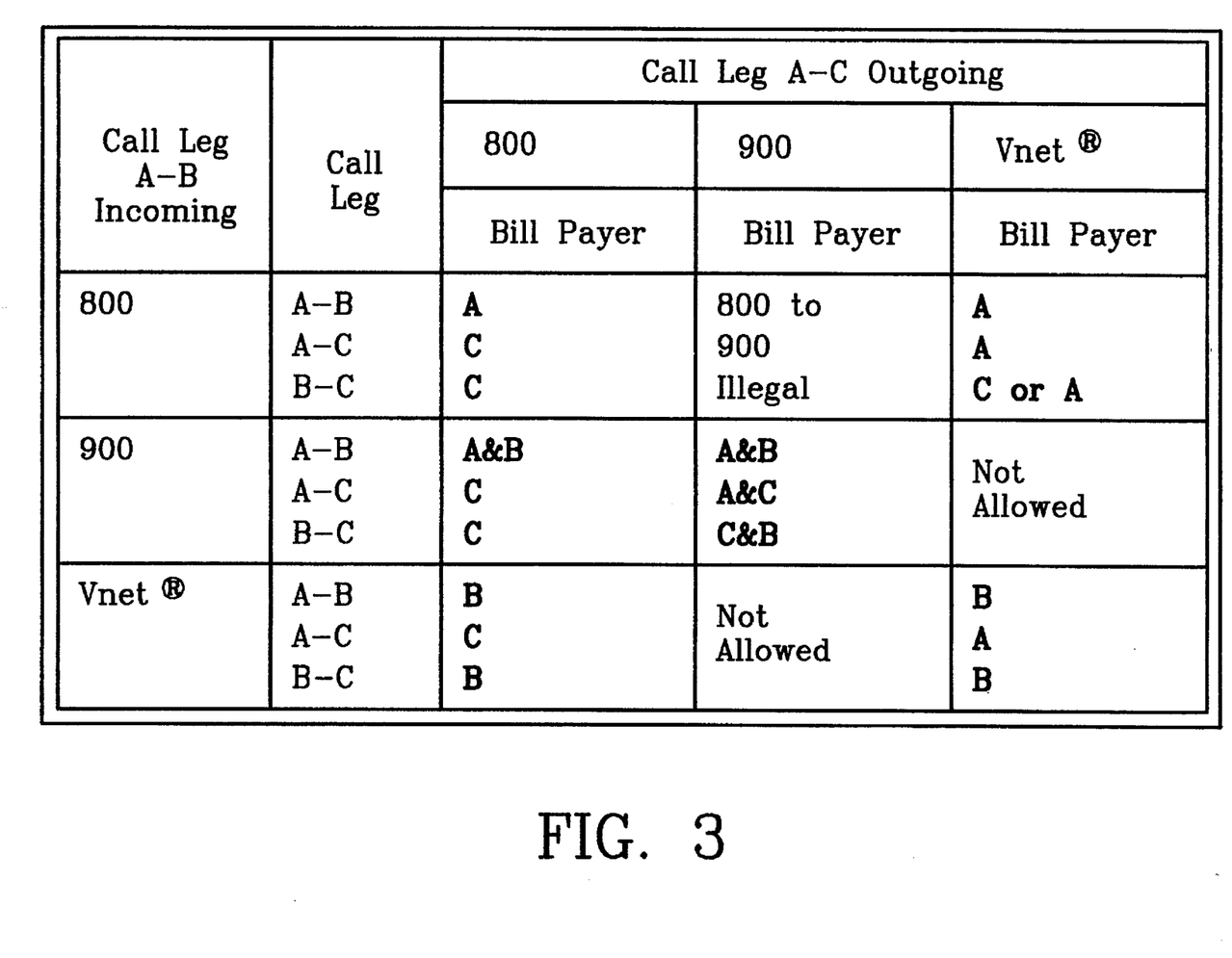
FIG. 3 is a table of allowable transfers and paying parties for the case when call leg A–B 3 is an incoming call to user-A 2, and call leg A–C 5 is an outgoing call from user-A 2.

FIG. 3 indicates whether a particular transfer is allowed for a representative combination of calls. If, for example, the incoming call leg A–B 3 was established by dialing 800 as the area code (user-A 2 has an 800 service), and the outgoing call leg A–C 5 is a number starting with 900 as the area code (user-C 14 has a 900 service), the transfer is not allowed, as shown in FIG. 3, since user-B 8 cannot be billed for the call leg B–C 7.

FIG. 3 also shows the responsible party for the call charges, provided the transfer is allowed. For example, in the situation where user-A has an 800 service (the calling leg A–B 3), and user-C 14 has a Vnet® service, the charges for the call legs are allocated according to the entries in the table of FIG. 3. In particular, user-A 2 pays for call leg A–B 3 and call leg A–C 5, while either user-A 2 or user-C 14 pays for call leg B–C 7 depending on their agreement.

Next is described the call transfer scenario in which the first leg A–B 3 and the second leg A–C 5 are both incoming to user-A 2. Referring to FIG. 1, user-B 8 calls user-A 2, and the long distance carrier network sets up call leg A–B 3 as an incoming call to user-A 2. User-C 14 also calls user-A 2 establishing call leg A–C 5.

User-A 2 first answers the call from user-B 8, puts user-B 8 on hold using CPE 4, and then answers the call from user-C 14. Alternatively, user-B 8 may not be placed on hold resulting in a temporary three-way conference call. Next, user-A 2, no longer wishing to participate in the conversation, indicates his request to CPE 4 to connect user-B 8 to user-C 14. User-A's CPE 4 sends a message to switch-A 6 to effect the transfer. Switch-A 6 bridges call legs A–B 3 and A–C 5, and releases the voice channels 13 and 15 for these two calls between itself and CPE 4, as shown in FIG. 2.

Before bridging call legs A–B 3 and A–C 5 to establish call leg B–C 7 shown in FIG. 2, switch-A 6 requests NCS 20, via the request message 9, to determine if call leg B–C 7 is allowed. The processor 24 accesses the database 22, and NCS 20 returns the response message 11 to switch-A 6.

Figure 4:
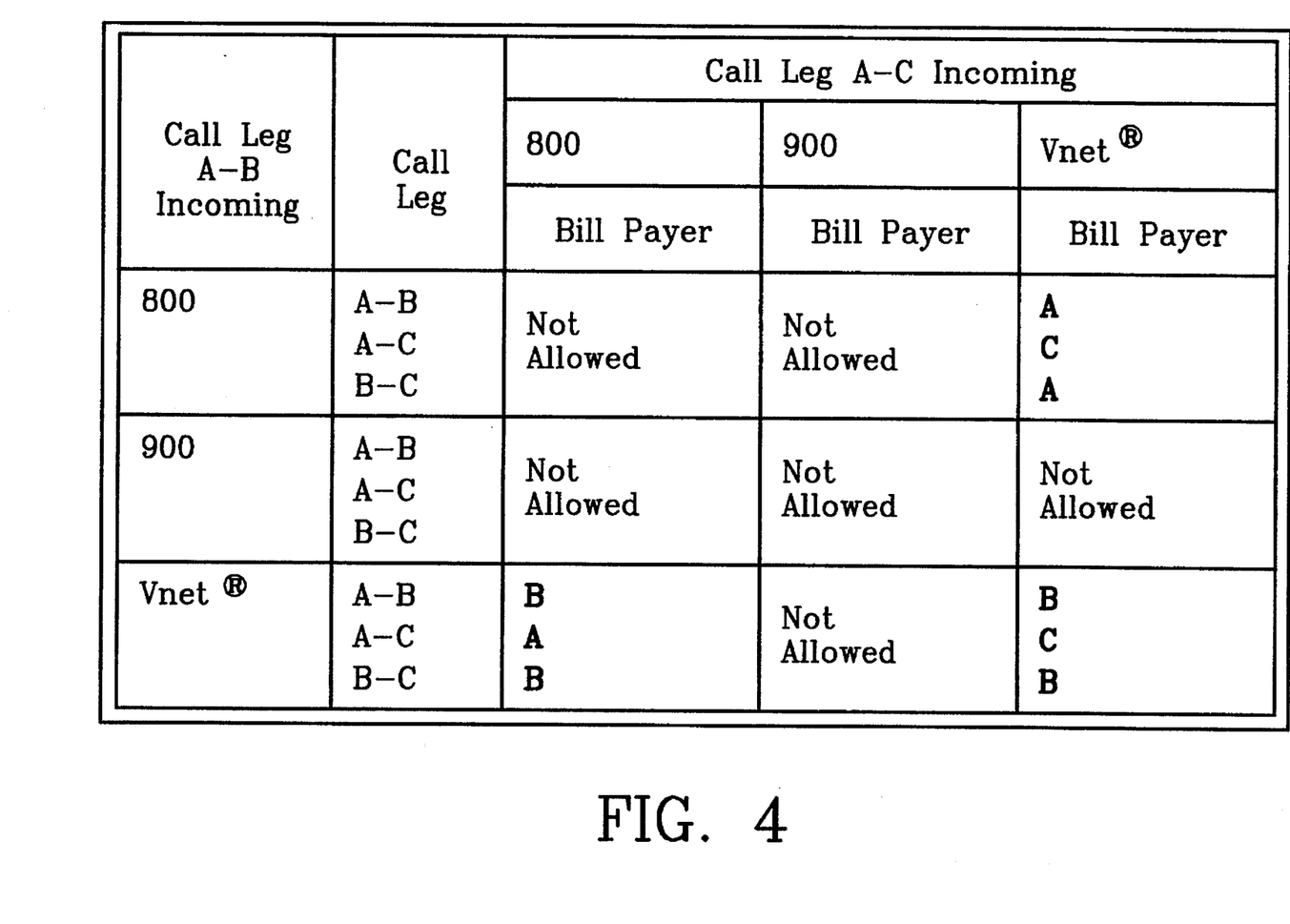
FIG. 4 is a table of allowable transfers and paying parties for the case when two call legs A–B 3 and A–C 5 are both incoming calls to user-A 2.

FIG. 4 indicates whether the transfer is allowed for a representative combination of calls, which like FIG. 3 serves merely as an example of combination of services. Other services and their combinations may be available, as known in the art. Similar to FIG. 3, FIG. 4 also shows the responsible party for the call charges if the transfer occurs.

The third call transfer scenario involves call leg A–B 3 outgoing from user-A 2, and call leg A–C 5 incoming to user-A 2. User-A 2 calls user-B 8, and the long distance carrier network sets up call leg A–B 3. While talking with user-B 8, user-A 2 receives an incoming call from user-C 14. User-A 2 puts user-B 8 on hold at CPE 4, and answers the call from user-C 14. Alternatively, user-B 8 may not be placed on hold resulting in a temporary three-way conference call.

User-A 2 then indicates to CPE 4 to transfer user-B 8 to user-C 14. CPE 4 sends a message to switch-A 6 to carry out the transfer. Switch-A 6 then connects user-B 8 to user-C 14, and releases the voice channels 13 and 15 for call legs A–B 3 and A–C 5 between itself and user-A's CPE 4.

The transfer occurs only after switch-A 6 sends the request message 9 to NCS 20. The processor 24 accesses the database 22 to determine whether call leg B–C 7 of FIG. 2 is allowed, and NCS 20 returns the response message 11 to switch-A 6.

Figure 5:
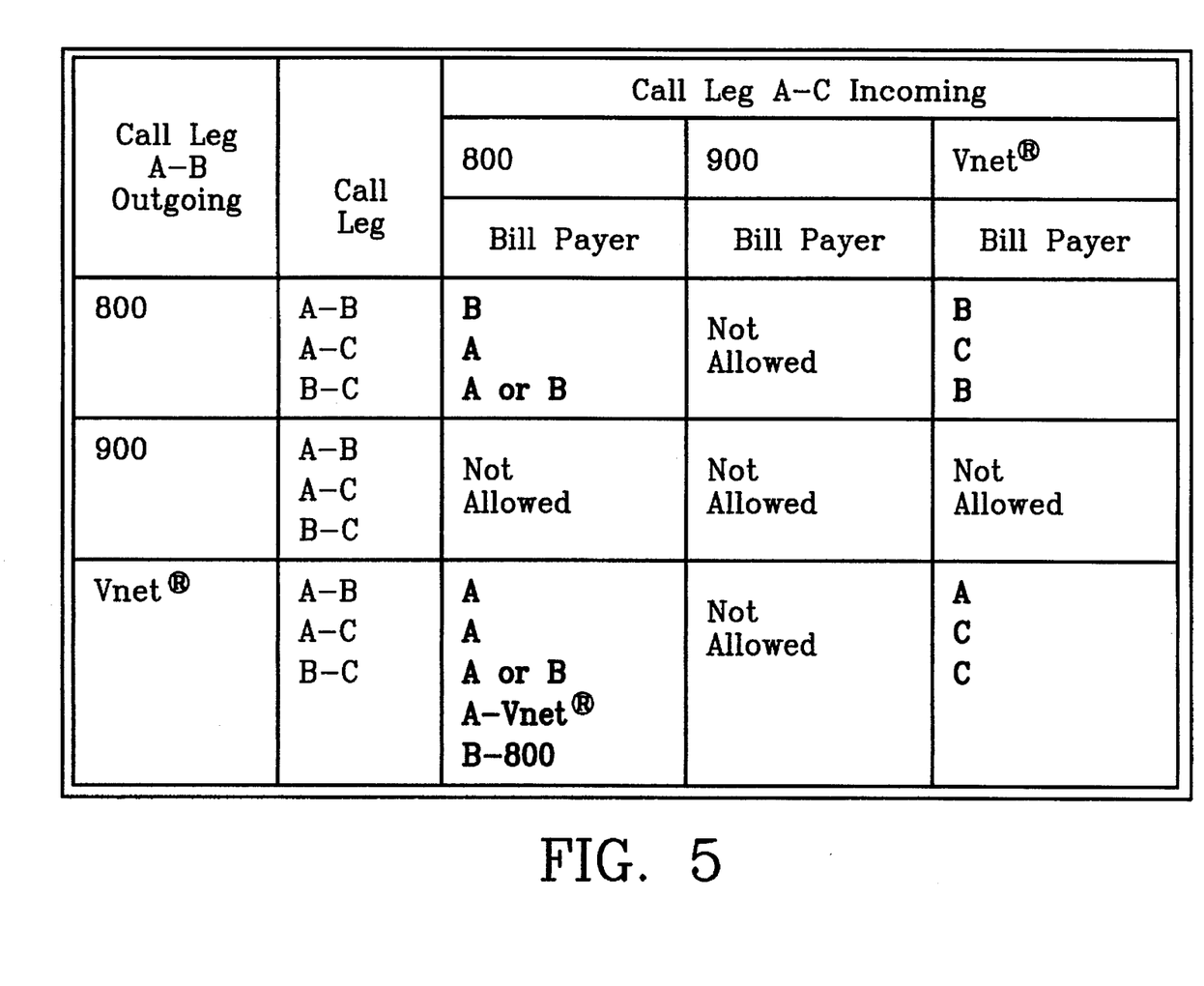
FIG. 5 is a table of allowable transfers and paying parties for the case when call leg A–B 3 is an outgoing call from user-A 2, and call leg A–C 5 is an incoming call to user-A 2.

Similar to the previous FIGS. 3 and 4, FIG. 5 indicates whether the transfer is allowed for each combination of calls, and if allowed, the responsible party for the call charges.

Finally, the call transfer scenario is described in which both call legs A–B 3 and A–C 5 are outgoing from user-A 2. User-A 2 calls user-B 8, and the long distance carrier network sets up call leg A–B as an outgoing call. User-A 2 then indicates to CPE 4 to put user-B 8 on hold, and calls user-C 14. Alternatively, user-B 8 may not be placed on hold resulting in a temporary three-way conference call. The long distance carrier network then sets up call leg A–C 5.

As in previous scenarios, user-A 2 decides to transfer user-B 8 to user-C 14 by indicating the request to CPE 4. Switch-A 6 bridges call legs A–B 3 and A–C 5, and releases the voice channels 13 and 15 to user-A's CPE 4 for these call legs.

Prior to the transfer, switch-A 6 sends a request message 9 to NCS 20. The processor 24 accesses the database 22 to determine whether call leg B–C 7 is allowed. NCS 20 then returns the response message 11 to switch-A 6.

Figure 6:
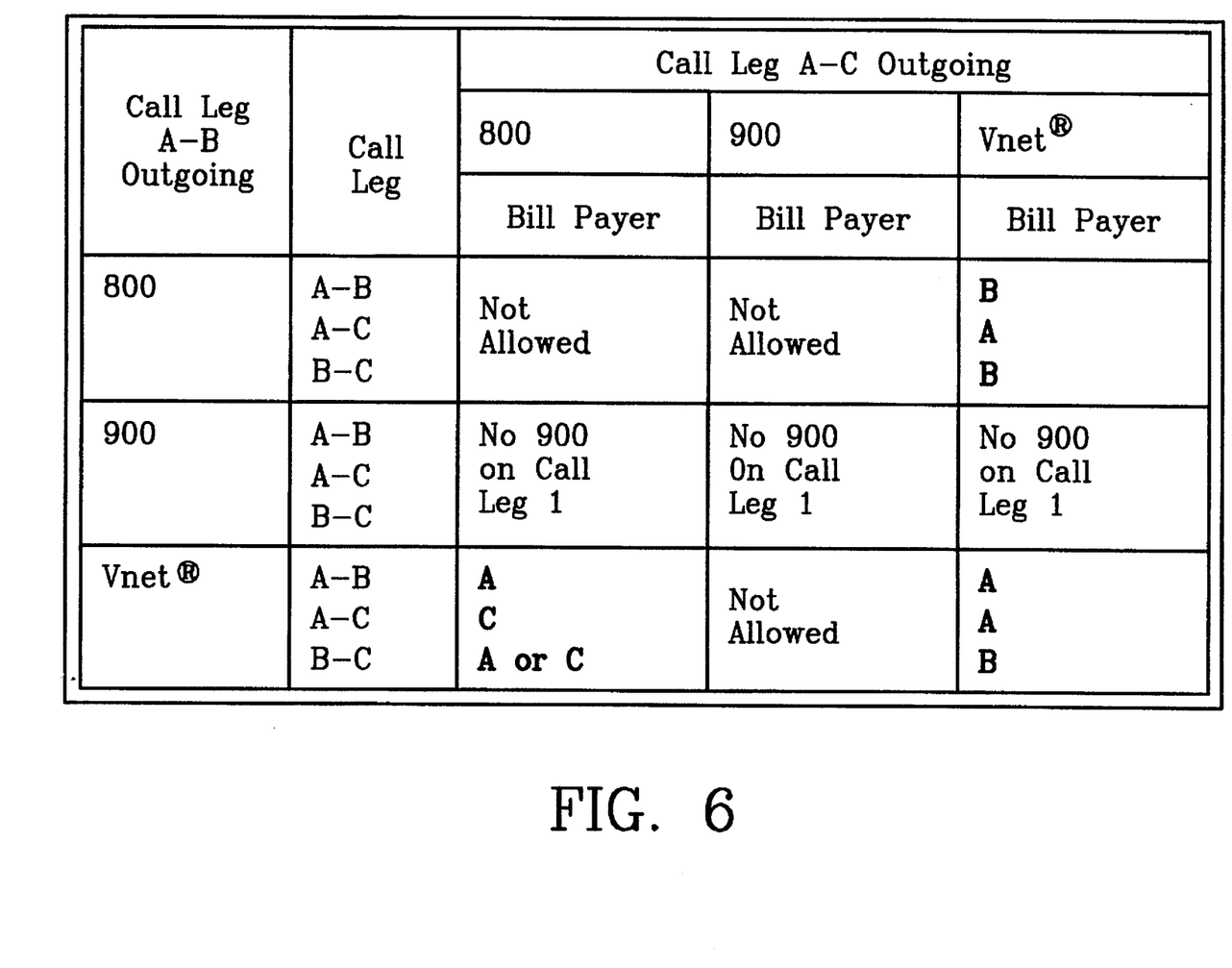
FIG. 6 is a table of allowable transfers and paying parties for the case when two call legs A–B 3 and A–C 5 are both outgoing calls from user-A 2.

As in FIGS. 3, 4, and 5, FIG. 6 indicates whether the transfer is allowed for the same representative combination of calls as in previous situations. FIG. 6 also shows the party responsible for paying for the call charges. FIGS. 3, 4, 5 and 6 show services and their combinations for illustrative purposes only. Other services and combinations may be used as known in the art. In addition, while the bill paying parties and the allowability of call legs are specifically illustrated in FIGS. 3, 4, 5 and 6, other arrangements agreed upon by customers and/or the long distance carrier are certainly available as known in the art.

The information in FIGS. 3, 4, 5 and 6 is contained in the database 22 and accessed by the processor 24 in response to the request message 9 from switch-A 6. After determining the allowability of the combination, as well as the paying party if applicable, NCS 20 returns this information to switch-A 2 in the response message 11. As stated above, the database 22 includes the following additional information: the party responsible for charges for call leg B–C 7, the service type (800, Vnet®, etc.) of call leg B–C 7, and whether user-B 8 and/or user-C 14 should be notified of the call transfer.

As shown in FIGS. 1 and 2, user-A 2 is involved in two calls: one with user-B 8 and the other with user-C 14. Each user is connected via CPE to a separate switch. In other situations, user-A 2, user-B 8, user-C 14, and their respective CPEs may not be served by the separate switch. FIGS. 7–12 show the situations when the three users are not connected to three different switches. The message flow, however, is similar to the previous situation of FIGS. 1 and 2 described above, and will, therefore, not be explained in detail. In reference to FIGS. 7–12, it is also understood that user-B 8 and user-C 14 may not be connected to their respective CPEs, and instead directly served by LEC (not shown) if a residential call is involved.

Figure 7:
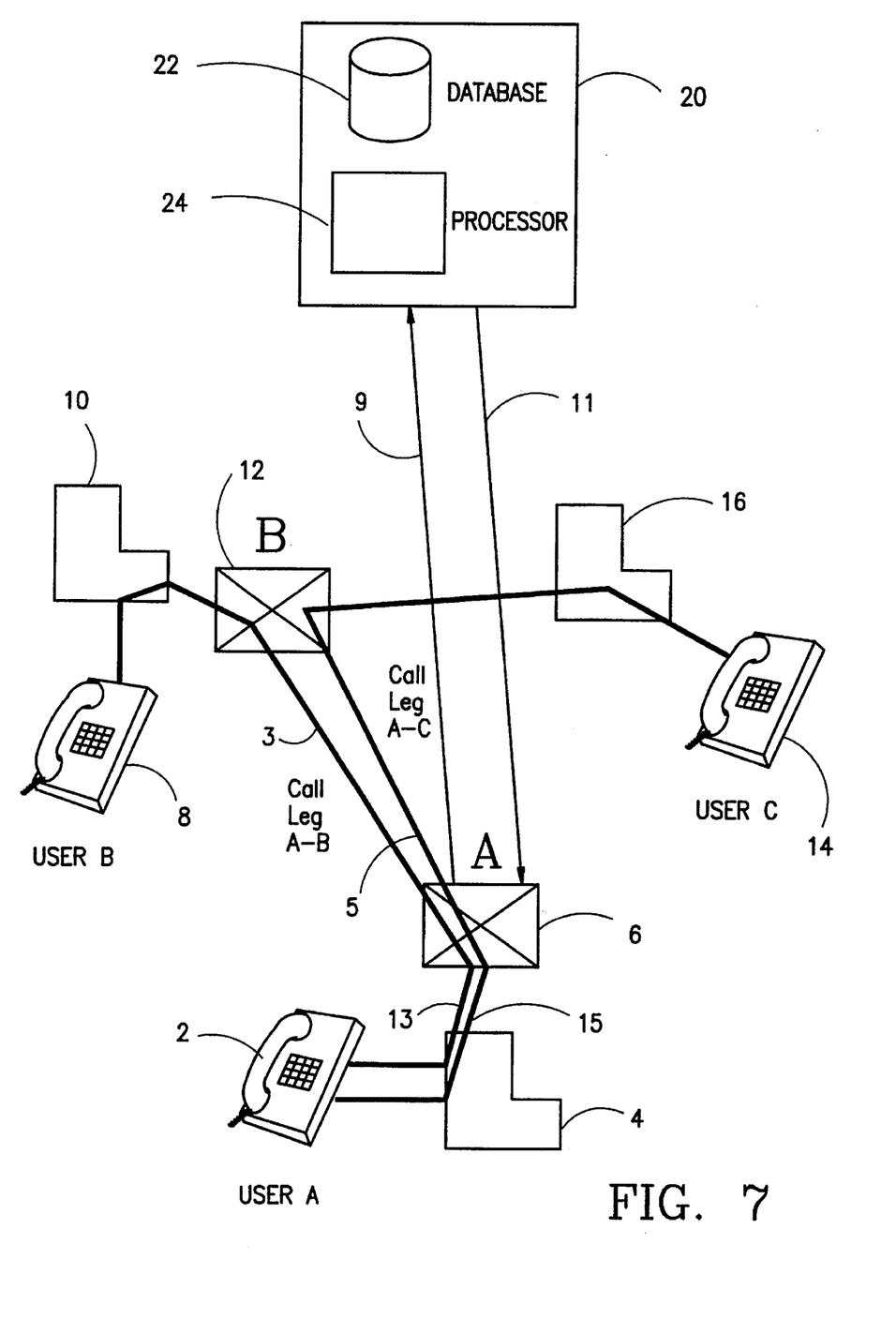
FIG. 7 is a telecommunications system for transferring a telephone call prior to the transfer, where user-B and user-C are connected to the same long distance network switch while user-A is connected to a different switch.
Figure 8:
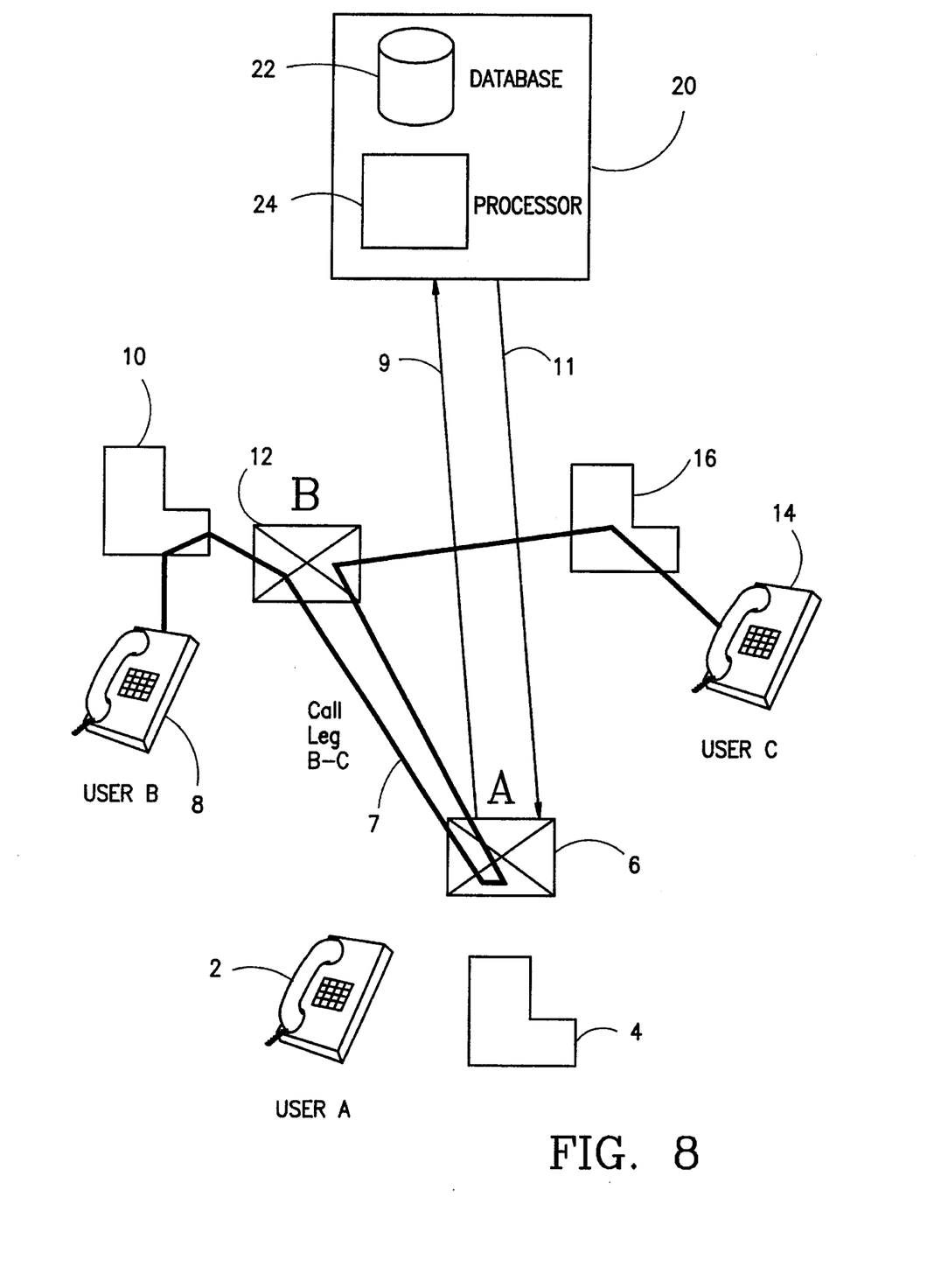
FIG. 8 is the telecommunications system of FIG. 7 after the call transfer.

In FIG. 7, user-B 8 and user-C 14 are connected via CPEs 10 and 16, respectively, to switch-B 12. User-A 2, however, is connected to switch-A 6. The functionality and message flow is similar to the situation where the three users are connected to three separate switches. Here, again, user-A 2 is involved in two different calls before invoking the call transfer function, and the steps involved in the transfer are the same as described above. FIG. 8 shows user-B 8 and user-C 14 communicating to each other via the call transferred by user-A 2, provided NCS 20 determined the allowability of call leg B–C 7 via the processor's 24 access of the database 22. Even though the two users are served by the same switch-B 12, the physical path is established via switch-A 6 which was responsible for invoking the call transfer request. User-A 2 at this point has no control over the transferred call, as shown in FIG. 8.

Figure 9:
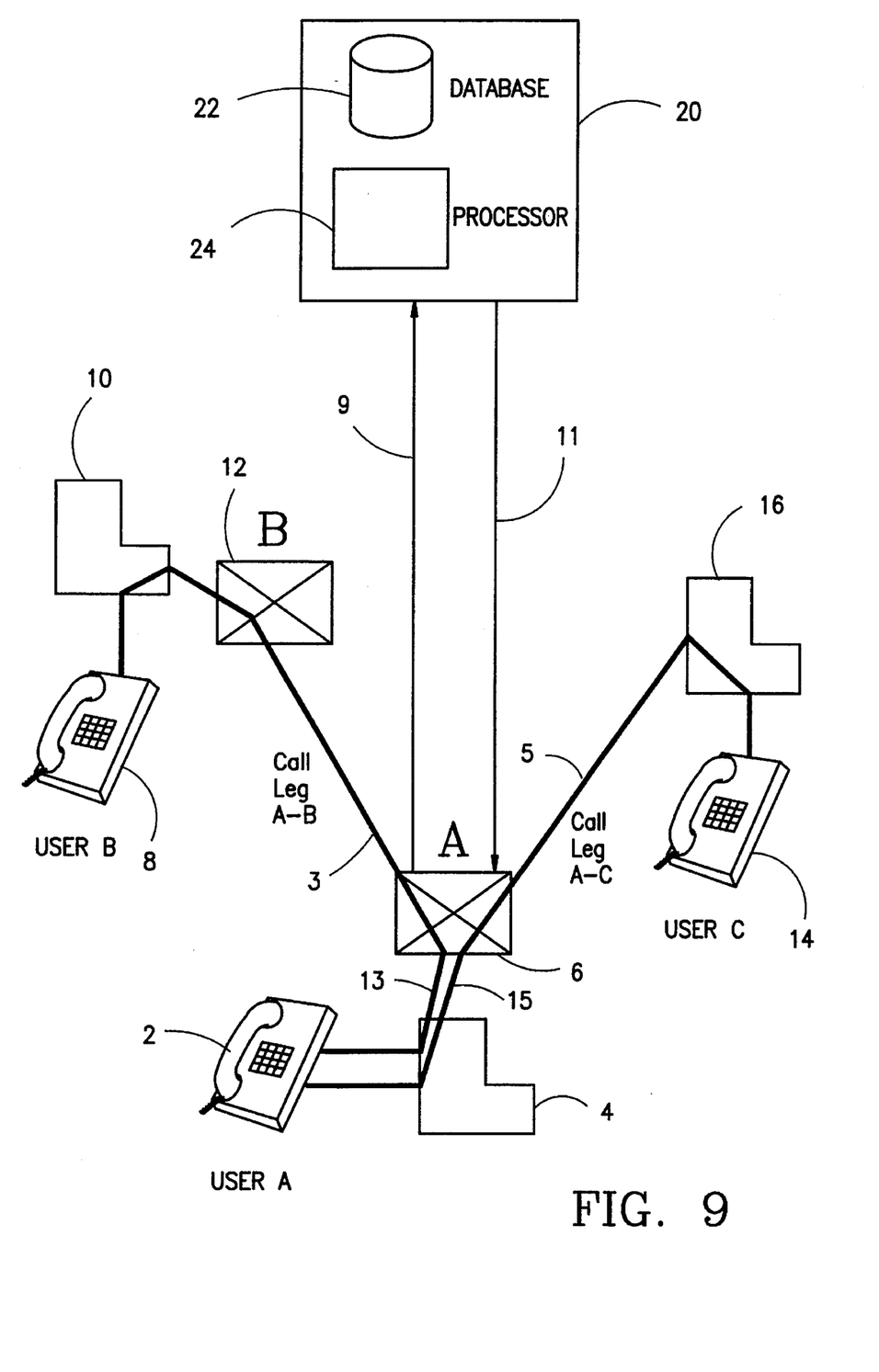
FIG. 9 is a telecommunications system for transferring a telephone call prior to the transfer, where user-A and user-C are connected to the same long distance network switch while user-B is connected to a different switch.
Figure 10:
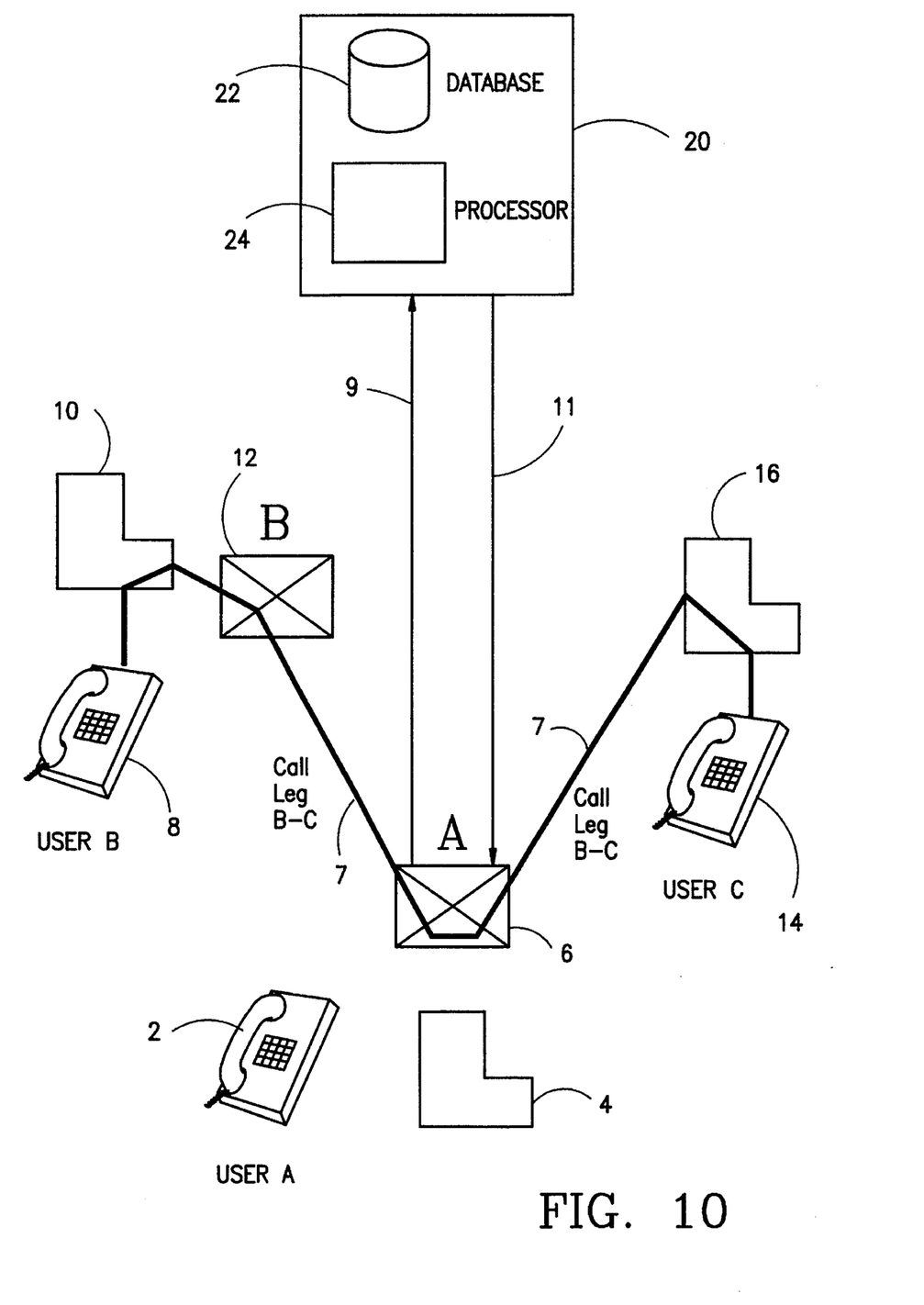
FIG. 10 is the telecommunications system of FIG. 9 after the call transfer.

In FIG. 9, user-A 2 and user-C 14 are connected to switch-A 6, while user-B 8 is served by switch-B 12. The call transfer proceeds in the same way as in the previous two cases. FIG. 10 shows user-B 8 connected to user-C 14 via switch-A 6, after the successful request for the call transfer by switch-A 6. If the transfer is allowed by NCS 20, similar to the previous cases, user-A 2 has no control over the transferred call, as shown in FIG. 10.

Figure 11:
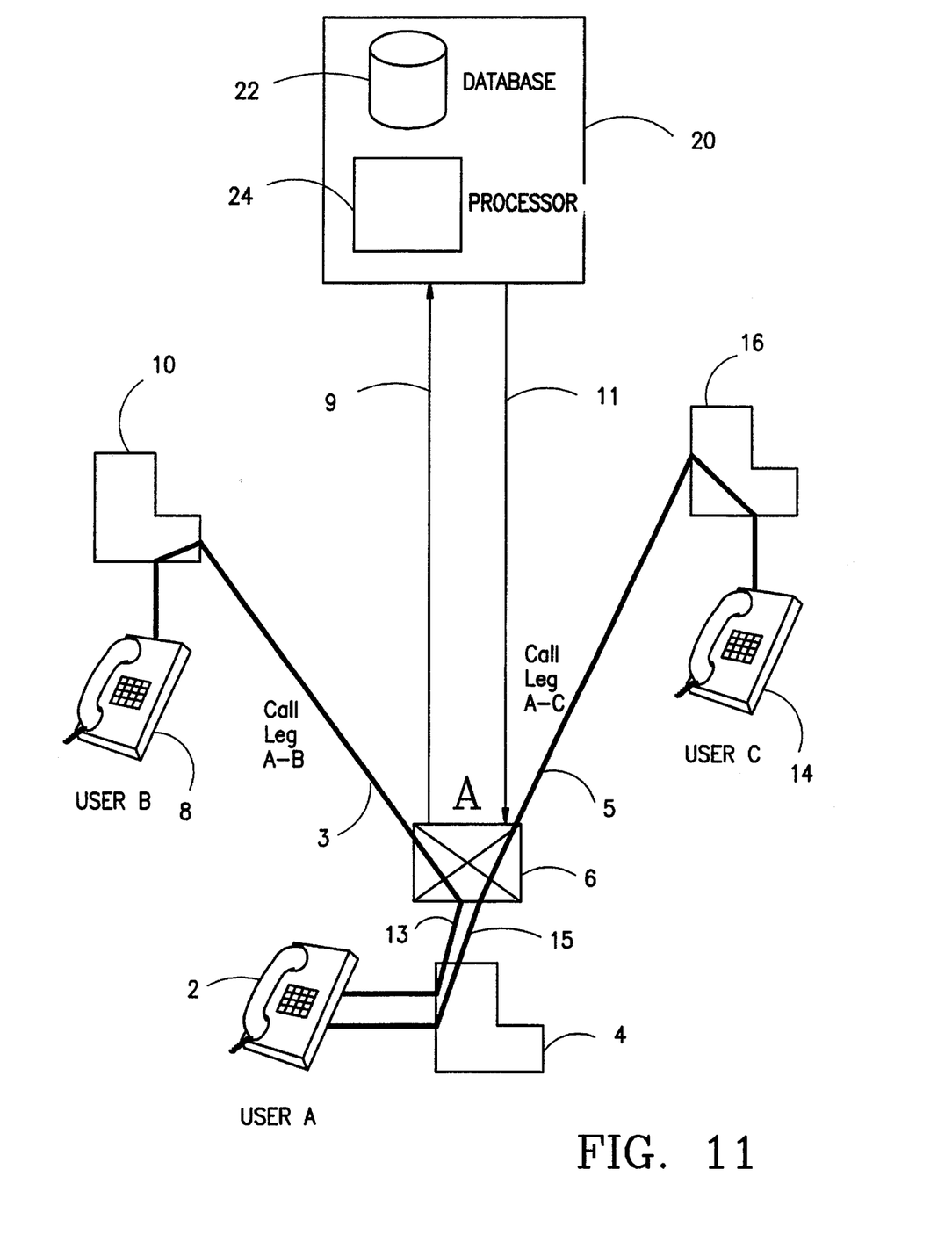
FIG. 11 is a telecommunications system for transferring a telephone call, shown prior to the transfer, where all three users are connected to the same long distance network switch.
Figure 12:
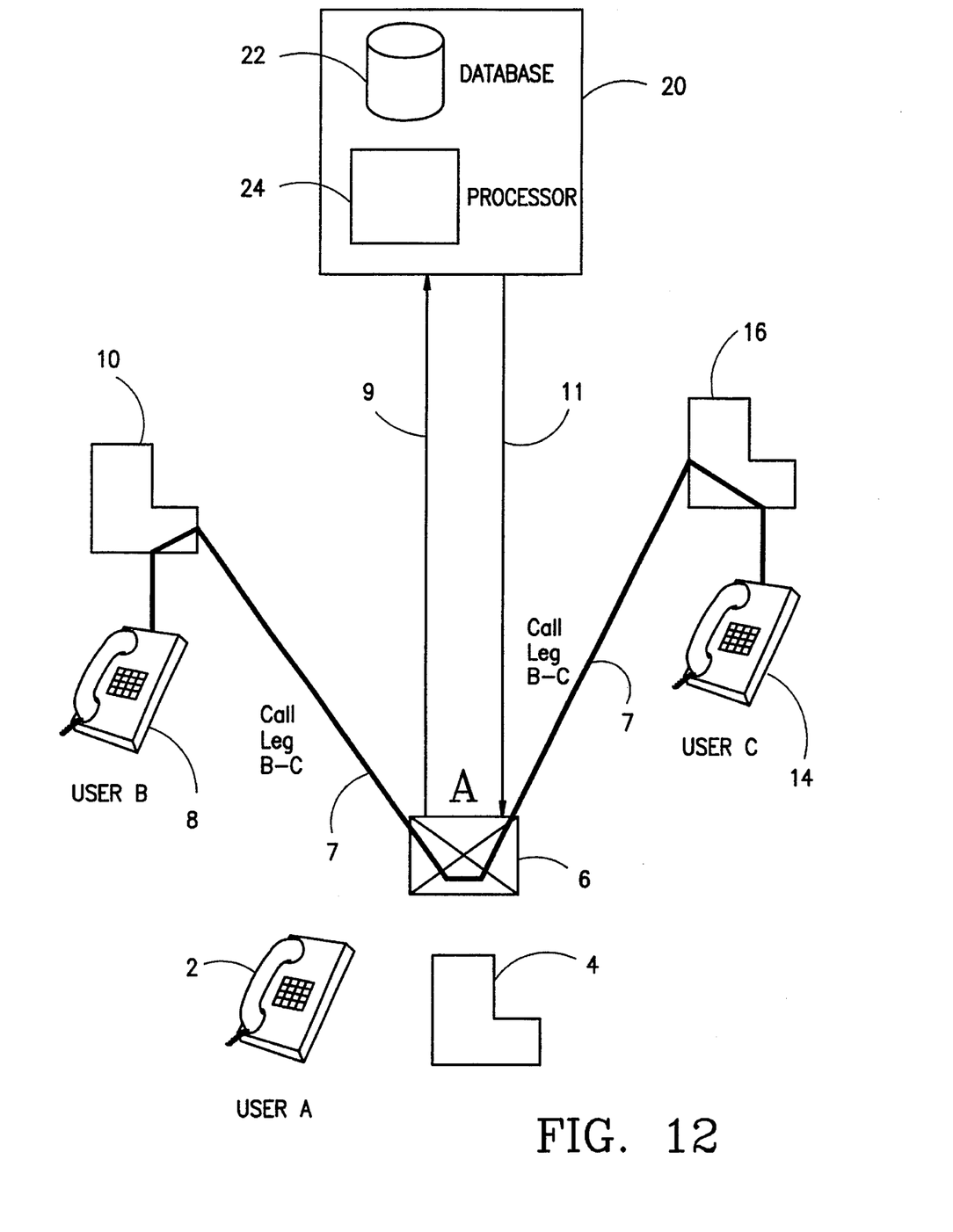
FIG. 12 is the telecommunications system of FIG. 11 after the call transfer.

In FIG. 11, the simplest configuration is shown where all three users are connected to the same switch-A 6. The call is transferred from user-A 2 as in the previous configurations, shown in FIG. 12. Similar to the previous configurations, user-A 2 has no control over the transferred call, as shown in FIG. 12.

In addition to the basic call transfer described above, the intelligent call transfer may be desired by some customers to expedite and tailor the call processing according their needs. In the intelligent call transfer, information about the incoming call is collected—using, for example, an automatic number identification (ANI), social security of the caller, or other identifiers—and based on the collected information, the intelligent decision is made on where to transfer the call.

For example, a customer dials 1-800 number to place a call to the company ABC located in New York. After reaching the customer service representative in New York, the customer actually wants specific information on a product offered by the company ABC. Instead of the customer service representative making a generic decision on the transfer to a general sales department, a database provides the specific transfer information by looking up a telephone number for a sales representative in Phoenix assigned to the customer. Without any participation by the customer service representative in New York, the call is more efficiently transferred to the sales representative specifically handling the customer's inquiry.

In the intelligent call transfer, switch-A 6 sends the request message 9 comprising any of the previously mentioned identifiers (ANI, social security, etc.) to NCS 20. After confirming the call transfer and screening user-A's identifier, NCS 20 determines the transfer information for the user-A. NCS 20 then responds to switch-A 6 by sending the message 11, which includes the transfer information. Switch-A 6 subsequently sets up the transfer call, call leg A–C 5, between users A and C.

To reduce the number of transactions between CPE 4 of user-A 2 and switch-A 6, another type of transfer may be employed—automatic transfer. This type of transfer is used when call leg A–C 5 is an outgoing call. User-A 2 provides one message to switch-A 6 to effect a transfer in contrast to the two transactions typically involved in the transfer: one of setting up call leg A–C 5, and then transferring the call.

In the automatic transfer, user-A 2 indicates in the message to switch-A 6 that all calls from user-B 8 should always be transferred to user-C 14. User-A 2 does not need to send a call setup for call leg A–C 5, followed by the transfer request. Furthermore, the automatic transfer provides the flexibility of identifying user-C 14 on a call-by-call basis: the first call could be transferred to user-C 14, the second call to user-C 14 (not shown), etc.

As described above, the customer specifies allowable combinations of calls and services reflected in the database 22. Based on the services and what transfer scenarios are allowed in the network, the customer can indicate which transfer scenarios are allowable to him. For example, the customer may have the 800 and Vnet® services, and allows the transfer to occur only when the incoming call leg A–B 3 is an 800 call, and the outgoing call leg A–C 5 is a Vnet® call. The customer disallows other combinations of calls like the 800 call leg A–B 3 incoming, and the 800 call leg A–C 5 outgoing.

In addition to the customer specified parameter on the allowable combination of calls and services, the disclosed telecommunications system gives the customers flexibility to individually tailor the call transfer function according to their optimum business requirements. The customers may specify several parameters in addition to the above, when they order the call transfer function.

Thus, another parameter that the customer may specify includes a notification of the call transfer to the users. This parameter identifies whether user-B 8 and user-C 14 receive an automated notification of the transfer.

Yet another parameter is a bill payer as described above. This parameter allows the user to specify the bill payer for call leg B–C 7 of the transferred call.

Still another parameter is the number of transfers. This parameter determines the number of transfer that the customers will allow as the transferring station. This number must be less than or equal to the number of transfers allowed by the long distance carrier network.

Yet another parameter is the transfer restrictions. Based on the supplementary code, time of day, day of week, and calling station's ANI, the customer can restrict the ability of a user to evoke the call transfer function.

Another feature of the disclosed invention is the ability of the long distance carrier network to generate a call detail record for each of the three call legs: call leg A–B 3, call leg A–C 5, and call leg B–C 7. The long distance carrier rates and bills call leg A–B 3 and call leg A–C 5 via its normal billing process. For example, if call leg A–B 3 is an 800 number, then the long distance carrier rates and invoices the call via the 800 billing process. If call leg A–C 5 is Vnet®, then the long distance carrier rates and invoices it via the Vnet® billing process.

Call leg B–C 7, the call transfer leg, is billed at the customer-defined service rates with additional surcharge depending on the type of the transfer: normal, intelligent or automatic. The call record for call leg B–C 7 contains the necessary information to rate the call and identify the bill payer. That information includes originating and terminating points, time points to determine billable time, corporate identification of the bill payer, switch/trunk of user-A 2, and the call transfer identifier.

To link the three records together, a network call identifier is applied to every call in the network regardless of whether the call is transfer or non-transfer related. Thus, the network call identifier uniquely identifies the call which is currently active or completed. Call detail records will appear for call legs A–B 3, A–C 5, and B–C 7 on the customers' reports that accompany the invoices, so that the customers can readily identify the transferred calls.

As an option, customers can have all of their transfer call charges appear on a single report. The report lists all of the calls involved in the call transfer and their associated charges. Customers decide on which invoice associated report they want to have all of their call transfer charges appear.

Network call transfer flow of events is broken down into the following steps.

(1) Call leg A–B 3 is established, and a billing record is started at the switch for this call.

(2) Call leg A–C 5 is established, and a billing record is started at the switch for this call.

(3) User-A 2 evokes the call transfer feature via CPE 4 which sends a message to switch-A 6. Within the message, the two calls are identified as requiring the connection with each other.

(4) Upon receiving the message, switch-A 6 verifies that the party requesting the call transfer has subscribed to this feature, and it is available. The call transfer count is then checked by switch-A 6 not to be unreasonably large. Even though, NCS 20 decides whether to allow the call transfer based upon the network limit of allowable call transfers, switch-A 6 will not launch a query to NCS 20 to request the transfer validation if the transfer count exceeds a large number.

(5) Switch-A 6 formulates the request message 9 for NCS 20 to allows the transfer. A parameter within the request message 9 will identify the request for the call transfer. The request message 9 contains information about user-A 2, user-B 8 and user-C 14 that NCS 20 may require to validate the request for the transfer. This information may include ANI, supplementary code if collected, call type, etc, as described above.

(6) After the processor 24 accesses the database 22 for the requested information, NCS 20 sends to switch-A 6 the response message 11. If the transfer request is denied, then the response message 11 contains the failure code. In the response message 11, NCS 20 will identify the originator of the transferred call as well as the call type.

(7) After receiving validation from NCS 20, switch-A 6 performs the transfer service.

(8) The switch A 6 will connect the two users, user-B 8 and user-C 14, into a new call. Switch-A 6 will start a billing record for the transferred call. Switch-A 6 will send a message to NCS 20 which will provide all three network call identifiers associated with the transfer-related calls (call legs A–B 3, A–C 5, and B–C 7). Switch-A 6 will start the disconnect procedures to user-A 2 for both calls.

(9) After notification of the transfer, a new billing record will be started for the newly transferred call. All messages for this new call will be tandemed through the transferring switch, switch-A 6. The call transfer count received is recorded at switch-A 6 so that it can be incremented if another transfer is subsequently evoked.

(10) Switch-A 6 will clear the calls to user-A 2. Thus, switch-A 6 clears the call with user-B 8 by sending the disconnect message to user-A 2. Switch-A 6 also clears the call with user-C 14 by sending the disconnect message to user-A 2. The billing records associated with the original two calls will be closed at the transferring switch, switch-A 6.

In all figures, the interface between the switch and the user may be Integrated Services Digital Network (ISDN). This is however not a requirement, and other interfaces, such as in-band, may be used in the disclosed invention. Since those skilled in the art can modify the disclosed specific embodiment without departing from the spirit of the invention, it is, therefore, intended that the claims be interpreted to cover such modifications and equivalents.

What is claimed is:

1. A telecommunications system in a telephone network of a long distance carrier for providing a call transfer function, comprising:

a first, second and third telephone stations, wherein each of respective telephone calls between said first and second telephone stations, and between said second and third telephone stations is either an incoming call or an outgoing call with respect to said second telephone station;

a first switching office connected via a customer premise equipment to said second telephone station, said second telephone station requesting said first switching office to establish communication between said first and third telephone stations; and a network control system, including a database and processing means, connected to said first switching office, said first switching office sending a request message to said network control system for inquiring whether said communication is allowed, said network control system providing a response message to said first switching office which establishes said communication, if allowed, between said first and third telephone stations and which disconnects said second telephone station from said first and third telephone stations, wherein said database has a table for providing information on allowability of said communication between said first and third telephone stations based on a type of telephone call.

2. The telecommunications system according to claim 1, further comprising a second switching office connected to one of said first and third telephone stations located outside an area served by said first switching office.

3. The telecommunications system according to claim 2, further comprising a third switching office connected to one of said first and third telephone stations located outside said area served by said first and second switching offices.

4. The telecommunications system according to claim 2, further comprising a voice response unit for interacting with said telephone calls automatically.

5. The telecommunications system according to claim 2, wherein said table further includes information for determining a billing party for each communication between said first and second telephone stations, said second and third telephone stations, and said first and third telephone stations.

6. The telecommunications system according to claim 2, wherein said network control system provides a separate billing record for each communication between said first and second telephone stations, said second and third telephone stations, and said first and third telephone stations.

7. The telecommunications system according to claim 2, wherein said database includes information for determining allowability of said communication between said first and third telephone stations based on at least one of the following: a supplementary code, a time of the day, a day of the week, and a calling station's ANI.

8. The telecommunications system according to claim 2, wherein said database includes information for determining whether said first, second and third telephone stations should be notified of a call transfer.

9. A method of providing a call transfer function in a telephone network of a long distance carrier, comprising the steps of:

setting up communication between a first telephone station and a second telephone station, and another communication between a second telephone station and a third telephone station, wherein each of respective telephone calls between said first and second telephone stations and between said second and third telephone stations is either an incoming call or an outgoing call with respect to said second telephone station;

requesting a switching office by said second telephone station to establish communication between said first and third telephone stations;

accessing a table in a network control system to determine allowability of said communication between said first and third telephone stations based on a type of telephone call; and connecting said first telephone station with said third telephone station and disconnecting said second telephone station from said first and third telephone stations, if said communication is allowed between said first and third telephone stations.

10. The method according to claim 9, further comprising the step of determining whether said first, second and third telephone stations should be notified of a call transfer.

11. The method according to claim 9, further comprising the step of providing a voice response unit at said second telephone station for interacting with said telephone calls automatically.

12. The method according to claim 9, further comprising the step of determining a billing party for each communication between said first and second telephone stations, said second and third telephone stations, and said first and third telephone stations based on information in said table.

13. The method according to claim 9, further comprising the step of providing a separate billing record for each communication between said first and second telephone stations, said second and third telephone stations, and said first and third telephone stations.

14. The method according to claim 9, further comprising the step of determining allowability of said communication between said first and third telephone stations based on at least one of the following: a supplementary code, a time of the day, a day of the week, and a calling station's ANI.

* * * * *